United States Patent

[11] 3,595,333

| [72] | Inventor | Gail G. Barbee<br>Aurora, Ill. |
|---|---|---|
| [21] | Appl. No. | 860,494 |
| [22] | Filed | Sept. 24, 1969 |
| [45] | Patented | July 27, 1971 |
| [73] | Assignee | Caterpillar Tractor Co.<br>Peoria, Ill. |

[54] HIGH CLEARANCE TRACTOR
2 Claims, 2 Drawing Figs.

[52] U.S. Cl. ................................................ 180/9.62,
305/28
[51] Int. Cl. ........................................................ B62d 55/08
[50] Field of Search ............................................. 180/9.5,
9.2, 9.52, 9.54, 9.58, 9.6, 9.62; 305/28

[56] References Cited
UNITED STATES PATENTS

| 1,330,253 | 2/1920 | Fuller ........................... | 305/28 |
| 2,651,378 | 9/1953 | La Llana ...................... | 180/9.6 |

*Primary Examiner*—Richard J. Johnson
*Attorney*—Fryer, Tjensvold, Feix, Phillips and Lempio

ABSTRACT: A high clearance track-type tractor wherein the undercarriage on each side of the tractor includes an upper frame member supporting a drive sprocket in a relatively conventional position relative to the tractor body. A lower track roller frame member is rigidly secured to the upper frame member and supports an idler sprocket, a plurality of track rollers, with an additional track roller being supported generally beneath the drive sprocket to form a triangular path for the endless track.

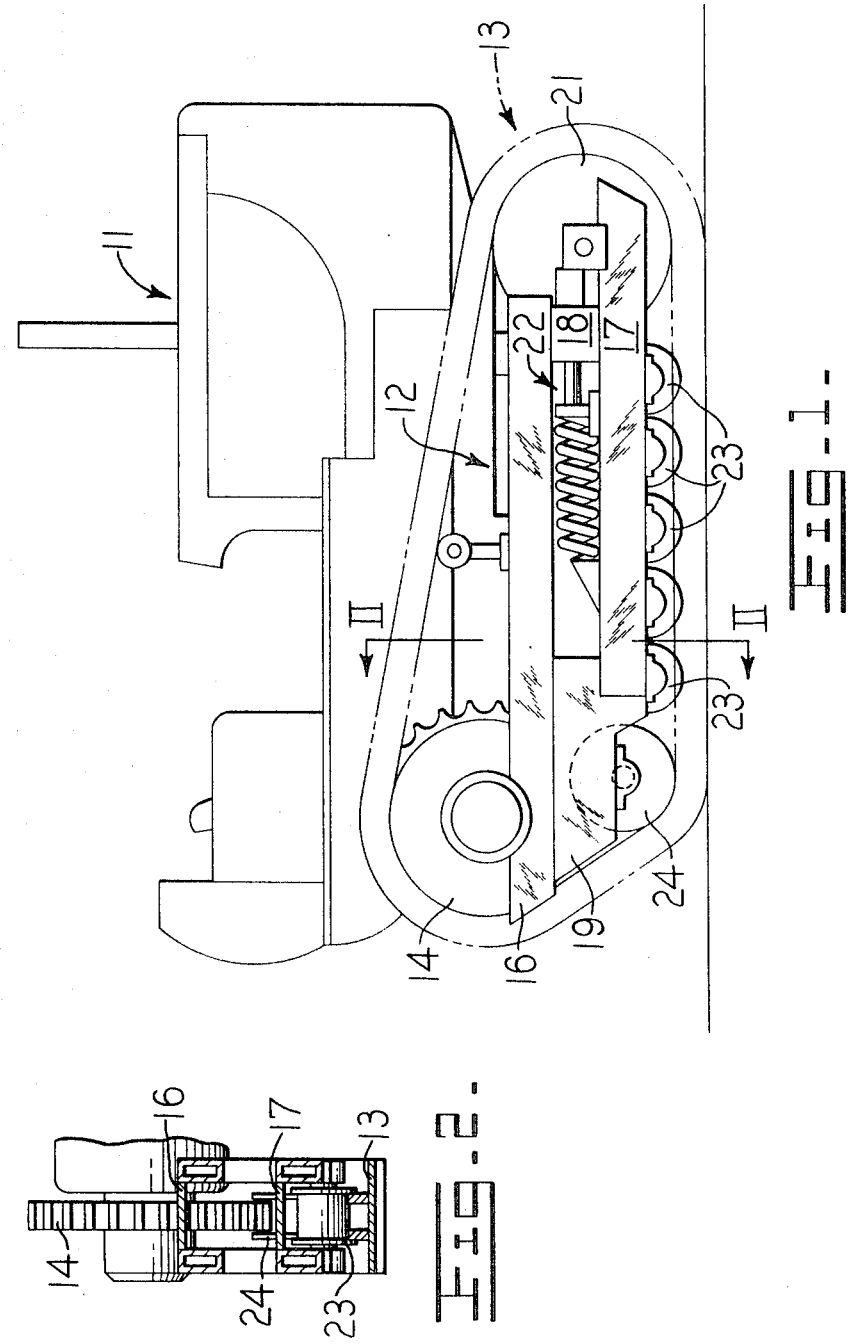

HIGH CLEARANCE TRACTOR

The present invention relates to track-type tractors and more particularly to such a tractor having relatively high ground clearance.

Most conventional track-type tractors have inadequate ground clearance for certain applications such as row crop farming operations. The present invention provides a track-type tractor having increased ground clearance suitable for use in such applications.

Specialized models of track-type tractors are relatively expensive to develop and produce. A particular advantage of the present tractor lies in the increased ground clearance obtained without the need for altering the basic drive train from that employed in conventional tractors of relatively low clearance. This is accomplished by maintaining the drive sprockets in the same position relative to the tractor body. The drive sprocket is mounted on an upper frame member with a lower frame member supporting the idler sprocket at its forward end and conventional track rollers for supporting the weight of the tractor upon the track.

Accordingly, it is an object of the present invention to provide a track-type tractor having substantially increased ground clearance.

It is a further object of the invention to provide increased ground clearance without substantially changing the basic drive train of the tractor.

It is still another object of the invention to provide such a high-clearance tractor wherein the undercarriage for the tractor exhibits adequate structural strength to accommodate the transfer of high horsepower output from the tractor engine to the tracks over long periods of operation.

Additional objects and advantages of the present invention are made apparent in the following description having reference to the accompanying drawing.

In the drawing:

FIG. 1 is a side view in elevation of the present high-clearance, track-type tractor; and FIG. 2 is a view taken along section line II–II of FIG. 1.

Referring now to the drawing, the present high-clearance tractor includes a generally conventional tractor body 11 supported at each side by an undercarriage, the undercarriage at one side of the tractor being indicated in FIG. 1 by the numeral 12. An endless track which is trained around the undercarriage 12 is indicated in broken lines at 13.

The undercarriage 12 includes a drive sprocket 14 which is mounted in a generally conventional position relative to the tractor body 11 and is coupled to the drive train (not otherwise shown) of the tractor.

To provide increased ground clearance for the tractor, the undercarriage includes a pair of parallel frame members, an upper frame member being indicated at 16 and a lower track roller frame being indicated at 17. The frame members 16, 17 are firmly secured together in spaced-apart relation by a spacer block 18 at their forward ends and a structural member 19 arranged below the rearward end of the upper frame member 16 and generally behind the lower frame member 17.

The drive sprocket 14 is rotatably secured toward the rear of the upper frame member 16. An idler sprocket 21 is rotatably secured at the forward end of the lower frame member 17 and is adapted for limited motion relative to the undercarriage 12 by means of a conventional recoil mechanism generally indicated at 22.

The lower frame 17 also rotatably supports a plurality of track rollers 23 which support the weight of the tractor upon the track 13. An additional track roller 24 is rotatably mounted generally beneath the drive sprocket 14. The additional track roller 24 has a large diameter than the other track rollers 23 to prevent a sharp bend in the track 13. The additional track roller 24 is preferably supported in rotatable relation by the structural member 19 which secures the rearward end of the frame members 16, 17. As shown in FIG. 1, the additional track roller 24 is also mounted slightly forward of the drive sprocket 14. It will also be noted from FIG. 1 that the drive sprocket 14, the idler sprocket 21 and the additional track roller 24 form a triangular path for the endless track 13.

The rigid inner connection of the two frame members 16, 17 also serves to maintain all of the sprockets and rollers in alignment for receiving the track.

It will be noted that generally conventional components are employed within the undercarriage 12. For example, the drive sprocket 14 is mounted in a conventional manner to the upper frame 16. Also, the idler sprocket 21, the recoil mechanism 22 and the track rollers 23 are secured in a conventional manner to the lower track frame 17. However, the present invention novelly provides for substantially increased ground clearance of the tractor by employing two rigidly secured frame members 16, 17 with the sprockets and rollers secured to the respective frame members in the manner described above.

What I claim is:

1. A high-clearance track-type tractor having an undercarriage at each side to support the tractor on endless track, the undercarriage at each side of the tractor comprising an upper frame member, a lower track roller frame member and means for rigidly securing together the forward ends and rearward ends respectively of the upper and lower frame members, a drive sprocket being rotatably secured to a rearward portion of each upper frame member, a plurality of track rollers being rotatably secured to each lower track roller frame, an additional track roller being rotatably mounted generally beneath each drive sprocket, an idler sprocket arranged at a forward end of each lower track roller frame, each idler sprocket being supported for longitudinal motion relative to the respective lower track roller frame by means of a recoil mechanism, the upper and lower frame members on each side of the tractor supporting the respective drive sprocket, track rollers and idler sprocket in alignment for receiving the endless track, the means for securing the respective frame members including a spacer arranged between the forward ends of the frame members and a structural member below the upper frame and at the rear of the lower frame member, the additional rollers being rotatably supported beneath and forwardly of the respective drive sprockets by the respective structural members.

2. A high-clearance track-type tractor having an undercarriage at each side to support the tractor on endless track, the undercarriage at each side of the tractor comprising an upper frame member, a lower track roller frame member and means for rigidly securing together the forward ends and rearward ends respectively of the upper and lower frame members, a drive sprocket being rotatably secured to a rearward portion of each upper frame member, a plurality of track rollers being rotatably secured to each lower track roller frame, an additional track roller being rotatably mounted generally beneath each drive sprocket, an idler sprocket arranged at a forward end of each lower track roller frame, each idler sprocket being supported for longitudinal motion relative to the respective lower track roller frame by means of a recoil mechanism, the upper and lower frame members on each side of the tractor supporting the respective drive sprocket, track rollers and idler sprocket in alignment for receiving the endless track, each additional roller being disposed forwardly of the respective drive sprocket and having a larger diameter than the plurality of track rollers, each additional track roller forming a triangular path for the endless track together with the respective drive sprocket and idler sprocket so that the endless track is in driven engagement with a substantial portion of the drive sprocket.